(12) United States Patent
Schuler et al.

(10) Patent No.: US 10,264,729 B1
(45) Date of Patent: Apr. 23, 2019

(54) AGRICULTURAL HARVESTING HEAD WITH NESTED DRAPER BELT DRIVE

(71) Applicant: Deere & Company, Moline, IL (US)

(72) Inventors: Mark Schuler, East Moline, IL (US); Nathaniel R. Bernklau, Davenport, IA (US)

(73) Assignee: Deere & Company, Moline, IL (US)

( * ) Notice: Subject to any disclaimer, the term of this patent is extended or adjusted under 35 U.S.C. 154(b) by 9 days.

(21) Appl. No.: 15/725,242

(22) Filed: Oct. 4, 2017

(51) Int. Cl.
*A01D 61/02* (2006.01)
*A01D 61/00* (2006.01)
*A01D 34/04* (2006.01)
*A01D 41/14* (2006.01)

(52) U.S. Cl.
CPC ........... *A01D 61/02* (2013.01); *A01D 61/002* (2013.01); *A01D 61/008* (2013.01); *A01D 34/04* (2013.01); *A01D 41/14* (2013.01)

(58) Field of Classification Search
CPC ........ A01D 61/02; A01D 41/14; A01D 57/20; A01D 41/06; A01D 61/002; A01D 61/008; A01D 34/04; A01F 12/10; B65G 15/30; B65G 15/46; B65G 21/2081; B65G 23/44
USPC ...................................... 198/804, 836.1, 837
See application file for complete search history.

(56) References Cited

U.S. PATENT DOCUMENTS

| | | | |
|---|---|---|---|
| 1,932,717 A | 10/1933 | Wickersham | |
| 2,510,245 A | 6/1950 | Munter | |
| 2,666,518 A | 1/1954 | Page, Jr. | |
| 4,429,517 A | 2/1984 | Lohrentz et al. | |
| 4,899,868 A * | 2/1990 | Johnson | A01D 61/02 198/520 |
| 4,938,010 A | 7/1990 | Guinn et al. | |
| 5,320,214 A * | 6/1994 | Kordis | B65G 15/64 198/750.1 |
| 5,819,383 A * | 10/1998 | Jourde | D04H 18/02 28/107 |
| 7,992,372 B1 * | 8/2011 | Coers | A01D 41/14 56/153 |
| 8,065,865 B1 | 11/2011 | Dow et al. | |
| 8,573,388 B2 * | 11/2013 | Hoffman | A01D 41/14 198/814 |
| 2006/0016165 A1 * | 1/2006 | Wernsmann | A01D 61/008 56/16.6 |
| 2014/0041354 A1 * | 2/2014 | Coon | A01D 41/14 56/158 |
| 2017/0251606 A1 * | 9/2017 | Van Overschelde | A01F 12/10 |
| 2017/0258009 A1 * | 9/2017 | Heyns | A01D 34/04 |
| 2018/0271018 A1 * | 9/2018 | Hoffman | B65G 15/42 |
| 2018/0303035 A1 * | 10/2018 | Hasenour | A01D 61/002 |

FOREIGN PATENT DOCUMENTS

DE 669934 C 1/1939

OTHER PUBLICATIONS

Ep Search Report issued in counterpart application No. 18196311.7, dated Jan. 30, 2019 (6 pages).

* cited by examiner

*Primary Examiner* — Arpad Fabian-Kovacs

(57) ABSTRACT

An agricultural harvesting head having an elongate frame, a rear wall, side conveyors and a center conveyor. The side conveyor having an endless belt conveyor with an endless recirculating belt supported on an idler roller and a drive roller. The side conveyor is driven by an endless drive belt nested within the endless recirculating belt.

14 Claims, 4 Drawing Sheets

AGRICULTURAL HARVESTING HEAD WITH NESTED DRAPER BELT DRIVE

FIELD OF THE INVENTION

This invention relates generally to agricultural combines. More particularly it relates to agricultural harvesting heads for mounting on agricultural combines. Even more particularly, it relates to draper headers for agricultural combines.

BACKGROUND OF THE INVENTION

Agricultural harvesters are designed to travel through agricultural fields harvesting crops. They include a self-propelled combine vehicle connected to an agricultural harvesting head (also called a "header") mounted on the front of the combine.

The head is elongate and extends perpendicular to the direction of travel of the combine. The function of the agricultural harvesting head is to sever the crop plants from the ground, to carry the cut crop material laterally inward to a central portion of the header, and then to convey the cut crop material rearward through a hole in a central rear wall of the header. Once the cut crop material is passed through the hole, it is received in the combine for further processing.

The agricultural harvesting head uses two side conveyors (typically auger conveyors or an endless belt conveyors) to draw the material laterally inward from both sides of the harvesting head to a central region of the head. A second conveyor then receives the cut crop material and conveys it rearward through the hole in the head.

In one common arrangement (often called a "draper"), the conveyors are endless belt conveyors. Each of these conveyors comprise an endless belt that is supported at opposing ends for recirculation about a drive roller and an idler roller. The drive roller is mounted close to the center of the header. The idler roller is located near an outermost lateral and of the header.

In recent years, draper headers have been increasing in width such that they can harvest a wider swath of crop material. Further, the combines on which they are mounted operate at greater ground speeds. As a result, the power required to drive the side conveyors has increased. At the same time, the headers are constructed heavier, requiring larger components, and those components require more space in the central region of the header. Thus there is less space adjacent to the drive rollers on either side of the hole to accommodate the larger motors and gearboxes that drive the drive rollers.

MacDon, a Canadian manufacturer of draper headers, produces a draper header with a motor coupled directly to the drive roller of the side draper in the traditional fashion.

Honeybee, another Canadian manufacturer of draper headers, produces a draper header in which the drive roller of the side draper is driven by a belt, and the drive motor for the belt is offset away from the drive roller and the hole in the header itself.

U.S. Pat. No. 1,932,717 shows an endless draper belt with a chain drive coupling the draper belt to the draper belt drive motor.

U.S. Pat. No. 2,510,245 shows an endless draper belt with a chain drive coupling the draper belt to the draper belt drive motor.

In each of the last three arrangements, the drive belt or drive chain is disposed behind (to the rear of) the draper belt itself, thus requiring additional space to house the additional drive belt/chain. This additional fore-and-aft space requires larger header frame members and thus additional weight to the header itself.

What is needed is an agricultural harvesting head of the draper type having a compact side draper drive arrangement. It is an object of this invention to provide such an arrangement.

SUMMARY OF THE INVENTION

In accordance with a first aspect of the invention, an agricultural harvesting head for harvesting crops in an agricultural field wherein the agricultural harvesting head is configured to be mounted on a combine harvester, the agricultural harvesting head comprising an elongate frame that extends perpendicular to a direction of travel of the harvesting head as it travels through a field harvesting crops; a rear wall that extends vertically and horizontally in a direction parallel to the longitudinal extent of the frame; a conveyor system further comprising a left side conveyor, a right side conveyor, and a center conveyor, wherein the left side conveyor is an endless belt conveyor configured to carry cut crop material laterally from the left end of the frame to a central region of the frame, wherein the right side conveyor is an endless belt conveyor configured to carry cut crop material laterally from the right end of the frame to the central region of the frame, and wherein the center conveyor is disposed to receive cut crop material from both the left side conveyor and the right side conveyor and to carry the cut crop material rearward through a hole in the rear wall and a hole in the frame; wherein the left side conveyor comprises an endless recirculating belt supported on an idler roller and a drive roller; and wherein the left side conveyor is driven by an endless drive belt nested within the endless recirculating belt.

The drive roller may support the endless recirculating belt on a central section of the drive roller, and the endless drive belt may be supported on a rear section. The drive roller may be adjacent to and to the rear of the central section.

The central section of the drive roller may have a larger outer diameter than the rear section of the drive roller.

The rear section of the drive roller may have an outer surface with teeth or splines that engage corresponding teeth or splines on an inner surface of the endless drive belt.

The agricultural harvesting head may further include a splined pulley nested within the endless recirculating belt between the drive roller and the idler roller.

The endless drive belt may be wrapped around the drive roller and the splined pulley with a tension sufficient to permit the splined pulley to drive the drive roller.

The agricultural harvesting head may further include a belt tensioner coupled between the splined pulley and the frame to apply the tension to the endless drive belt.

The belt tensioner may be nested within the endless recirculating belt.

The agricultural harvesting head may further include a driveshaft upon which the splined pulley is supported.

A first end of the driveshaft may be nested within the endless recirculating belt, and a second end of the driveshaft may extend outside the endless recirculating belt.

The agricultural harvesting head may further include a drive motor disposed outside the endless recirculating belt, and the drive motor may be coupled to the driveshaft to drive the driveshaft.

The drive motor may be supported on the rear wall of the agricultural harvesting head.

The drive motor may be slidably supported on the rear wall of the agricultural harvesting head.

The right side conveyor may further include a second endless recirculating belt supported on a second idler roller and a drive roller; and the right side conveyor may be driven by an endless drive belt nested within the endless recirculating belt.

DETAILED DESCRIPTION OF THE PREFERRED EMBODIMENTS

Figure 1:
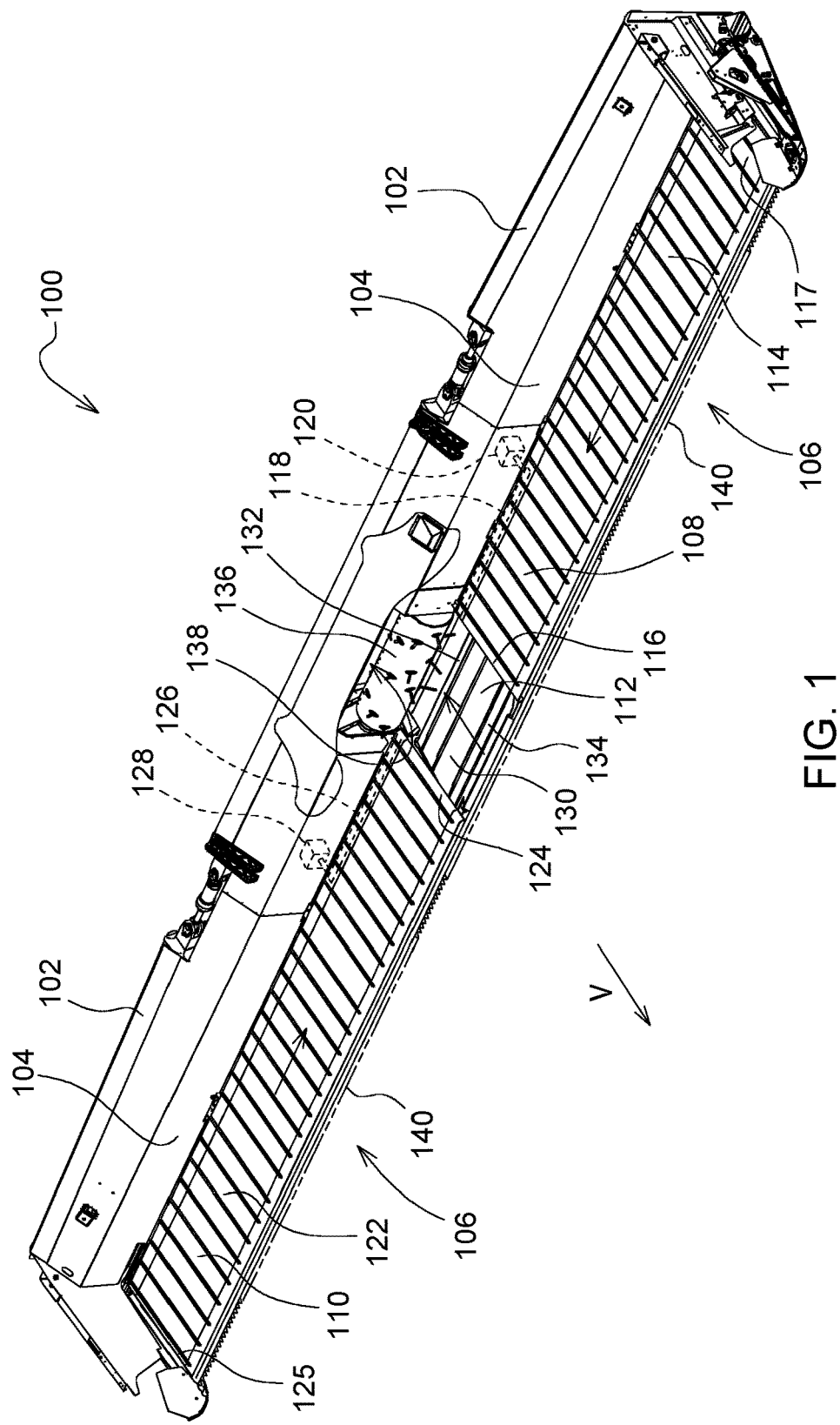
FIG. 1 is a perspective view of an agricultural harvesting head in accordance with the present invention.
Figure 2:
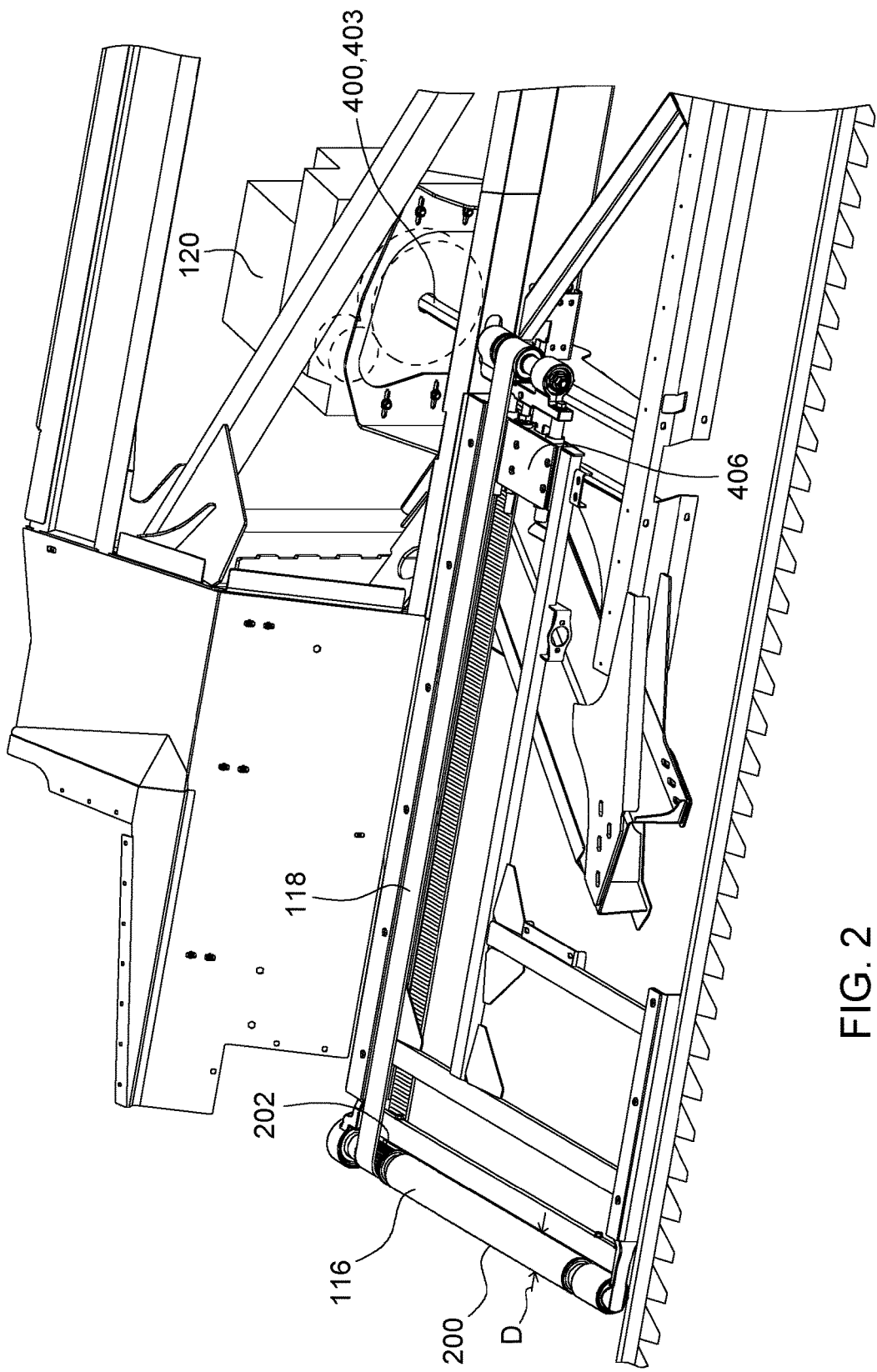
FIG. 2 is a fragmentary perspective view of the left side of the agricultural harvesting head of FIG. 1 with the left side draper belt removed.
Figure 3:
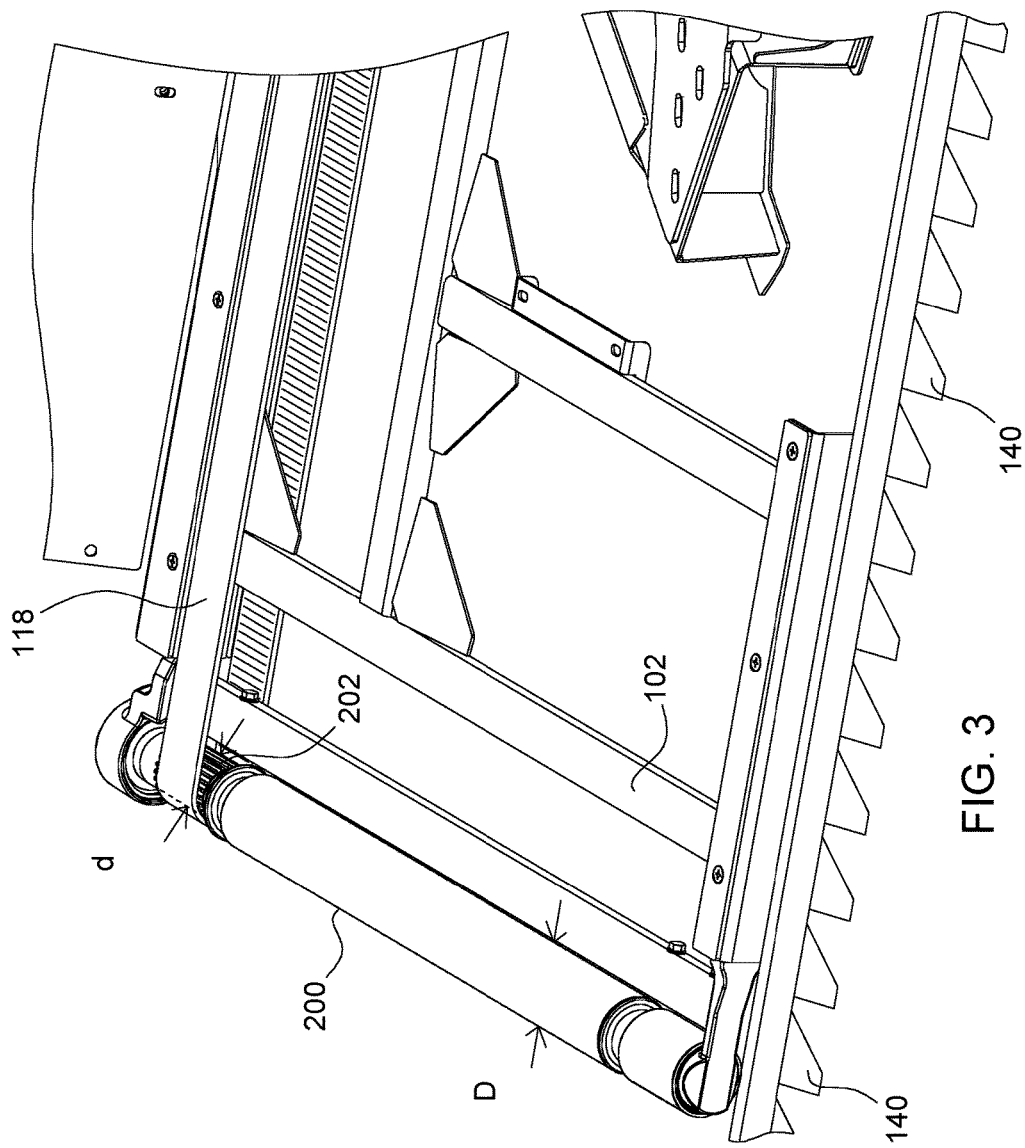
FIG. 3 is a fragmentary plan view of the left side of the agricultural harvesting head of FIG. 2 showing details of the left side draper belt drive roller.

In FIGS. 1 and 2, an agricultural harvesting head 100 comprises an elongate frame 102 that extends laterally and perpendicular to a direction of travel "V". The frame 102 extends substantially the entire width of the head 100. The frame 102 is fixed to a vertical rear wall 104 that also extends substantially the entire width of the head 100.

The frame 102 supports a conveyor system 106 that extends forward from the bottom of the frame 102 and laterally outward, generally perpendicular to the direction of travel "V".

Conveyor system 106 is an endless belt conveyor system, in which each conveyor of the conveyor system 106 is supported on at least two rollers, including a drive roller and an idler roller. Each drive roller is coupled to a rotary drive motor which drives the drive roller in rotation. The conveyor system 106 forms a working floor of head 100.

Conveyor system 106 includes three conveyors: the left side conveyor 108, right side conveyor 110, and a center conveyor 112. These three conveyors comprise substantially the entire horizontal working surface of the combine between the reciprocating knife 140 and the rear wall 104.

The left side conveyor 108 includes an endless recirculating belt 114 that is supported at its inner end on a drive roller 116 located adjacent to the center conveyor 112 in the central region of the agricultural harvesting head 100, and is supported at its opposing outer end on a idler roller 117 that is located adjacent to the leftmost end of the agricultural harvesting head 100.

An endless drive belt 118 is coupled at its inner end to the drive roller 116 to drive the drive roller 116 in rotation. The endless drive belt 118 is coupled at its opposing outer end to a drive motor 120 which drives the endless drive belt 118 in rotation.

The right side conveyor 110 includes an endless recirculating belt 122 that is supported at its inner end on a drive roller 124 located adjacent to the center conveyor 112 in the central region of the agricultural harvesting head 100, and is supported at its opposing outer end on an idler roller 125 that is located adjacent to the rightmost end of the agricultural harvesting head 100.

An endless drive belt 126 is coupled at its inner end to the drive roller 124 to drive the drive roller 124 in rotation. The endless drive belt 126 is coupled at its opposing outer end to a drive motor 128 which drives the endless drive belt 126 in rotation.

The center conveyor 112 includes an endless recirculating belt 130 that is supported on a drive roller 132 at its rear end, and an idler roller 134 at its front end. The drive roller 132 is driven by a drive motor (not shown).

The drive roller 116 and the drive roller 124 are driven in a direction that draws the upper surface of their respective endless recirculating belts inwardly toward the central region of the agricultural harvesting head 100. The left side conveyor 108 and the right side conveyor 110 carry the crop inwardly from the respective left and the right ends of the agricultural harvesting head 100. The cut crop material is carried over the top of the drive roller 116 and the drive roller 124 and is deposited upon the endless recirculating belt 130 of the center conveyor 112.

The drive roller 132 of the center conveyor 112 is driven in a direction that draws the upper surface of the endless recirculating belt 130 in a rearward direction. This carries cut crop material deposited upon the center conveyor 112 rearwardly, and underneath a drum conveyor 136. The drum conveyor 136 is driven in a direction that engages the top of the cut crop material and pulls it underneath the drum conveyor 136 itself. The crop material carried rearward underneath the drum conveyor 136 is ejected through a rectangular hole 138 in the rear wall of the agricultural harvesting head 100. The cut crop material passing through the rectangular hole 138 is received in a feederhouse (not shown) of an agricultural combine (not shown) in the conventional manner.

An elongate reciprocating knife 140 is fixed to a forward lower edge of the frame 102 and extends across the entire width of the agricultural harvesting head 100 along the lower forward margin of the head 100. Knife 140 is disposed immediately in front of and at the same height as the forward edge of the endless recirculating belts of the left side conveyor 108 and the right side conveyor 110.

Agricultural combines carry the agricultural harvesting head 100 through the field harvesting crops in a direction "V" (FIG. 1). As the knife 140 engages crop plants, it severs the crop plants adjacent to the ground, the cut crop plants fall backwards and onto the endless belts of the conveyor system 106.

FIG. 2 illustrates details of the left side conveyor 108. The right side conveyor 110 is configured identically to the left side conveyor 108, but in mirror image form. Therefore, the discussion below regarding the construction and operation of the left side conveyor 108 is equally applicable to the right side conveyor 110.

Figure 4:
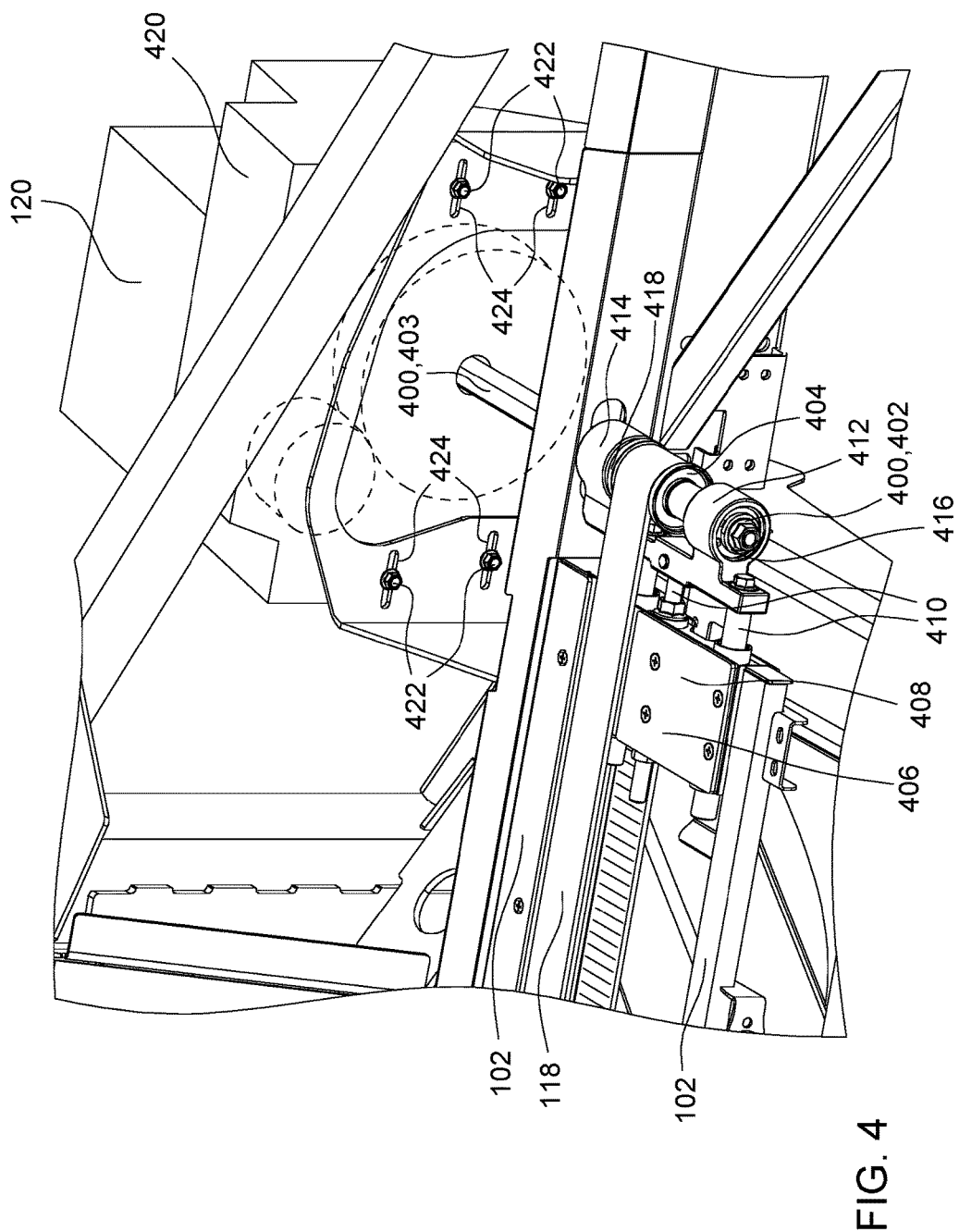
FIG. 4 is a fragmentary plan view of the left side of the agricultural harvesting head of FIG. 2 showing details of the left side draper belt drive motor.

In FIGS. 2 and 4, the drive roller 116 has a central section 200 with an outside diameter "D". The central section 200 supports the endless recirculating belt 114 which contacts the outer surface of the central section 200 and is driven by the central section 200. The drive roller 116 has a rear section 202 which has a diameter "d". The diameter "d" is smaller than the diameter "D". The belt 114 extends around, but does not contact the rear section 202. The rear section 202 has a toothed or splined outer surface. This outer surface supports and engages the endless drive belt 118, which drives the drive roller 116 in rotation.

Endless drive belt 118 wraps around and rests on the outer surface of the rear section 202. Endless drive belt 118 has teeth or splines on its inside surface that engage the mating teeth or splines on the outer surface of the rear section 202. The mutual interengagement of these toothed/splined surfaces permit the endless drive belt 118 to communicate significant torque to the drive roller 116 in spite of its reduced diameter (as compared to the diameter of the central section 200).

The diameter of the outer surface of the drive belt 118 as it passes over the drive roller 116 is greater than the diameter "d" of the rear section 202 and less than the diameter "D" of the central section 200. A small clearance is provided between the inner surface of the endless recirculating belt 114 and the outer surface of the endless drive belt 118. This clearance prevents friction between belt 114 and belt 118 and permits material from being trapped between the two belts.

The drive roller 116 is supported on bearings at its opposing ends to permit the drive roller 116 to freely rotate when driven by the drive motor 120. The drive roller 116 is held in place by the frame 102. This maintains the drive roller 116 in a fixed position with respect to the frame 102.

Referring to FIG. 4, the outer loop of the endless drive belt 118 is also nested within the endless recirculating belt 114. The outer loop is supported on a driveshaft 400 which has a front portion 402 nested entirely within the endless recirculating belt 114, and a rear portion 403 extending outside the endless recirculating belt 114. The front portion 402 supports a toothed or splined pulley 404 which is driven by the driveshaft 400. The outer loop of the endless drive belt 118 wraps around the splined pulley 404 and is driven by the pulley 404. The pulley 404 has teeth that are sized to engage the teeth or splines on the inner surface of the endless drive belt 118.

A belt tensioner 406 is also disposed nested within the endless recirculating belt 114. The belt tensioner includes a body 408 having internal springs that apply outward pressure on guide pins 410 which extend through the body. These guide pins 410 are fixed to bearing supports 412, 414, which are disposed on opposite sides of the pulley 404. Bearings 416, 418 are respectively disposed between the bearing supports 412, 414 and the driveshaft 400. Bearings 416, 418 are disposed to permit the free rotation of the driveshaft 400, while applying a constant outward pressure to the driveshaft 400. In this manner, the belt tensioner 406 maintains sufficient tension in endless drive belt 118 so that it can be driven by driveshaft 400 and can communicate torque and power to the drive roller 116.

The rear portion 403 of the driveshaft 400 is coupled to a reduction gearbox 420 which drives the driveshaft 400. The reduction gearbox 420 is coupled to the drive motor 120, which drives the reduction gearbox 420. Thus, the drive motor 120 is coupled to and drives the driveshaft 400.

In order to permit the 406 to function, the driveshaft 400 must be permitted to move in a direction perpendicular to the rotational axis of the driveshaft 400. This movement is enabled by the support structure used to support the drive motor 120 and the reduction gearbox 420 on frame 102. In particular, four headed fasteners 422 are fixed to and extend forward from the casing of the reduction gearbox 420. These fasteners 422 extend through four corresponding slots 424 that are formed in the frame 102. The slots 424 extend parallel to the longitudinal extent of the frame and parallel to the longitudinal extent of the endless recirculating belt 114. The fasteners 422 slide within the slots 424, and therefore permit lateral movement of the reduction gearbox 420 (and hence the driveshaft 400) both toward and away from the drive roller 116. As the belt tensioner 406 applies force to the driveshaft 400, it causes the driveshaft 400 to move away from the drive roller 116, thereby tensioning the endless drive belt 118 as the headed fasteners 422 simultaneously slide within slots 424.

The invention is defined by the claims. The description and figures in this document are intended to show a few ways of making and using the claimed invention. Other ways of making the claimed invention are known to those skilled in the art.

The invention claimed is:

1. An agricultural harvesting head for harvesting crops in an agricultural field, wherein the agricultural harvesting head is configured to be mounted on a combine harvester, the agricultural harvesting head comprising:
    an elongate frame that extends perpendicular to a direction of travel of the harvesting head as it travels through a field harvesting crops;
    a rear wall that extends vertically and horizontally in a direction parallel to the longitudinal extent of the frame;
    a conveyor system further comprising a left side conveyor, a right side conveyor, and a center conveyor, wherein the left side conveyor is an endless belt conveyor configured to carry cut crop material laterally from the left end of the frame to a central region of the frame, wherein the right side conveyor is an endless belt conveyor configured to carry cut crop material laterally from the right end of the frame to the central region of the frame, and wherein the center conveyor is disposed to receive cut crop material from both the left side conveyor and the right side conveyor and to carry the cut crop material rearward through a hole in the rear wall and a hole in the frame;
    wherein the left side conveyor comprises an endless recirculating belt supported on an idler roller and a drive roller; and
    wherein the left side conveyor is driven by an endless drive belt nested within the endless recirculating belt.

2. The agricultural harvesting head of claim 1, wherein the drive roller supports the endless recirculating belt on a central section of the drive roller, and further wherein the endless drive belt is supported on a rear section the drive roller adjacent to and to the rear of the central section.

3. The agricultural harvesting head of claim 2, wherein the central section of the drive roller has a larger outer diameter than the rear section of the drive roller.

4. The agricultural harvesting head of claim 2, wherein the rear section of the drive roller has an outer surface with teeth or splines that engage corresponding teeth or splines on an inner surface of the endless drive belt.

5. The agricultural harvesting head of claim 1, further comprising a toothed or splined pulley nested within the endless recirculating belt between the drive roller and the idler roller.

6. The agricultural harvesting head of claim 5, wherein the endless drive belt is wrapped around the drive roller and the splined pulley with a tension sufficient to permit the splined pulley to drive the drive roller.

7. The agricultural harvesting head of claim 6, further comprising a belt tensioner coupled between the splined pulley and the frame to apply the tension to the endless drive belt.

8. The agricultural harvesting head of claim 7, wherein the belt tensioner is nested within the endless recirculating belt.

9. The agricultural harvesting head of claim 5, further comprising a driveshaft, upon which the splined pulley is supported.

10. The agricultural harvesting head of claim 9, wherein a first end of the driveshaft is nested within the endless recirculating belt, and wherein a second end of the driveshaft extends outside the endless recirculating belt.

11. The agricultural harvesting head of claim 10, further comprising a drive motor disposed outside the endless recirculating belt, wherein the drive motor is coupled to the driveshaft to drive the driveshaft.

12. The agricultural harvesting head of claim 11, wherein the drive motor is supported on the rear wall of the agricultural harvesting head.

13. The agricultural harvesting head of claim 12, wherein the drive motor is slidably supported on the rear wall of the agricultural harvesting head.

14. The agricultural harvesting head of claim 1, wherein the right side conveyor comprises a second endless recirculating belt supported on a second idler roller and a second drive roller; and wherein the right side conveyor is driven by an endless drive belt nested within the endless recirculating belt.

* * * * *